United States Patent
Zhao (10) Patent No.: US 12,203,707 B2
(45) Date of Patent: Jan. 21, 2025

(54) HIGH TEMPERATURE HEAT EXCHANGE AND HEAT STORAGE UNIT, AND MECHANISM AND DEVICE THEREOF

(71) Applicant: Xiaofeng Zhao, Guangdong (CN)

(72) Inventor: Xiaofeng Zhao, Guangdong (CN)

( * ) Notice: Subject to any disclaimer, the term of this patent is extended or adjusted under 35 U.S.C. 154(b) by 0 days.

(21) Appl. No.: 18/264,523

(22) PCT Filed: Nov. 7, 2022

(86) PCT No.: PCT/CN2022/130192
§ 371 (c)(1),
(2) Date: Aug. 7, 2023

(87) PCT Pub. No.: WO2023/231300
PCT Pub. Date: Dec. 7, 2023

(65) Prior Publication Data
US 2024/0426559 A1 Dec. 26, 2024

(30) Foreign Application Priority Data
May 31, 2022 (CN) .......................... 202210608538.5

(51) Int. Cl.
*F28D 20/00* (2006.01)
*F28D 17/00* (2006.01)
(Continued)

(52) U.S. Cl.
CPC ....... *F28D 20/0056* (2013.01); *F28D 17/005* (2013.01); *F28D 17/04* (2013.01); *F28F 9/26* (2013.01); *F28D 2020/0069* (2013.01)

(58) Field of Classification Search
CPC .... F28D 20/0056; F28D 17/005; F28D 17/04; F28D 2020/0069; F28F 9/26
(Continued)

(56) References Cited

U.S. PATENT DOCUMENTS 3,363,675 A * 1/1968 Bierhoff ................ F24H 7/0433
237/63
3,802,497 A * 4/1974 Kummel ................ B01D 51/10
165/158

(Continued)

FOREIGN PATENT DOCUMENTS

CN     213273904 U  *  5/2021
CN     118836720 A  *  4/2023

(Continued)

*Primary Examiner* — Jon T. Schermerhorn, Jr.
(74) *Attorney, Agent, or Firm* — Wang Law Firm, Inc.

(57) ABSTRACT

The present invention relates to a high temperature heat exchange and heat storage unit, and mechanism and device thereof. The high temperature heat exchange and heat storage unit comprises a housing containing a plurality of solid heat storage particles. The housing has a fluid inlet on the top of the housing, and has a plurality of fluid outlets on the bottom of the housing; a plurality of overflow ports, a plurality of overflow pipes, and a heat exchange pipe is disposed inside the housing; each overflow pipe communicates with one corresponding overflow port and one corresponding fluid outlet of the housing, and a highest point of each overflow pipe is lower than the top of the housing. No sealing structure needs to be disposed at the fluid inlet of the housing, so that the high temperature heat exchange and heat storage unit is simple in structure. It is also very convenient and flexible to assemble, and the assembly requirements of high temperature heat exchange and heat storage mechanism of various different specifications can be satisfied.

14 Claims, 5 Drawing Sheets

(51) Int. Cl.
*F28D 17/04* (2006.01)
*F28F 9/26* (2006.01)

(58) Field of Classification Search
USPC .......................................................... 165/10
See application file for complete search history.

(56) References Cited

U.S. PATENT DOCUMENTS

| | | | | |
|---|---|---|---|---|
| 5,286,351 A | * | 2/1994 | Salmon | B01D 3/42 |
| | | | | 203/1 |
| 6,286,587 B1 | * | 9/2001 | Landry | F28D 7/12 |
| | | | | 165/110 |
| 2001/0045273 A1 | * | 11/2001 | Langl | F28D 7/0075 |
| | | | | 165/145 |
| 2024/0247598 A1 | * | 7/2024 | Daniel | F01K 3/186 |

FOREIGN PATENT DOCUMENTS

| | | | | |
|---|---|---|---|---|
| CN | 109974326 B | * | 8/2023 | |
| JP | 2024516482 A | * | 12/2022 | |

\* cited by examiner

HIGH TEMPERATURE HEAT EXCHANGE AND HEAT STORAGE UNIT, AND MECHANISM AND DEVICE THEREOF

TECHNICAL FIELD OF THE INVENTION

The present invention relates to the field of heat storage and heat exchange devices, and in particular to a high temperature heat exchange and heat storage unit, and mechanism and device thereof.

BACKGROUND OF THE INVENTION

In the power generation process, there are peaks and valleys in the electrical load of the power grid, and the characteristic of power is "ready to use". At present, due to the lack of load adjustment capability of power generation, a large number of new energy power generation resources are wasted, which is called "wind and solar curtailment". As the main force of electrical load adjustment, the coal-field power generation accounts for more than 60% in China. The adjustment capabilities of coal-fired power generation devices have reached their limits. The researches show that the most effective means to further improve the electrical load adjustment capability is energy storage.

At present, there are three technical routes for large-scale energy storage, i.e., storage batteries, pumped storage and heat storage. The storage barriers are costly, and difficult to achieve economic benefits in the current power market. The pumped storage is limited by natural conditions, and is uneven in resource distribution and small in total resource amount, so there is a big gap between the development scale and the power adjustment demand. The production process of the thermal power plant is a process of converting thermal energy into electric energy. By combining heat storage with thermal power devices, the power generation load adjustment capability of the thermal power plant can be effectively improved. Since the exiting thermal power resources are sufficient, by matching the machine units with cheap heat storage devices, the load adjustment range of the machine units can be effectively improved, the power grid's capability to absorb new energy power generation is improved, and the power grid's capability to adjust the electrical load is also improved.

A Chinese Patent CN105890193B (patent NO: ZL201610511217.8) disclosed a reinforced heat exchange mechanism for a high temperature heat storage device, and a high temperature heat storage device thereof, and specifically disclosed the following contents: the reinforced heat exchange structure comprises a closed container; the top of the container communicates with at least one air blowing pipe and at least one air extraction pipe; at least one pipe is vertically inserted into the bottom of the container; and, the peripheral wall of the container can permeate a liquid heat transfer fluid at a high temperature from outside to inside and isolate other solid heat storage materials.

In the above patent, the reinforced heat exchange mechanism and the high temperature heat storage device thereof can continuously circulate the liquid heat transfer fluid up and down at a high temperature, and can greatly improve the heat exchange intensity and heat exchange effect between the heat exchange pipe and the heat storage medium, greatly improve the heat storage capacity of the heat storage device and also improve the heat storage and conversion efficiency. However, the high temperature heat storage device in the above patent still has a problem of low heat exchange efficiency. Specifically, the flow of the molten salt in the heat storage device is intermittently driven by nitrogen, and the total amount of the molten salt driven each time is very small compared with the total amount of the molten salt in the device. Moreover, since the solid iron-based heat storage material is filled in the device in a powder form, the flow resistance of the molten salt is high. During the actual operation, the molten salt in the device can only have a displacement of about 50 mm per hour, which is far superior to the heat exchange capacity between the molten salt and the solid heat storage medium or between the molten salt and the steam pipe in a purely static state. However, from the perspective of the heat transfer theory, a too low flow rate will lead to too low heat exchange capacity. In addition, due to the uneven distribution of the flow resistance in the molten salt flow range in the heat exchanger, the flow of the molten salt in some regions will be nearly a standstill, thereby resulting in a failure of the heat exchange, which means a very low heat storage/release capacity and it cannot satisfy the requirements for the heat storage/release capacity in the production and usage process, resulting in low thermal efficiency of the whole device.

Further, the above patent also has the following problems: 1, the used iron-based solid heat storage material will release harmful gases such as sulfide at a high temperature, resulting in environment pollution; 2, by using nitrogen for driving, a large amount of nitrogen will be consumed, thus increasing the operation cost; and 3, the high temperature heat storage device in this patent does not have a function of storing the heated external heat source, for example, storing the heat energy of the high temperature molten salt (heat transfer oil) heated by solar light heat, storing the high temperature molten salt (heat transfer oil) heated by off-peak electricity. In addition, the existing heat storage and exchange devices are large in size and inconvenient to transport and assemble.

SUMMARY OF THE INVENTION

It is a first object of the present invention to provide a high temperature heat exchange and heat storage unit with high heat exchange efficiency.

It is a second object of the present invention to provide a high temperature heat exchange and heat storage unit which is high in heat exchange efficiency and can realize self-sealing.

It is a third object of the present invention to provide a high temperature heat exchange and heat storage mechanism having the high temperature heat exchange and heat storage unit, which is high in heat exchange efficiency and convenient to transport and assemble.

It is a fourth object of the present invention to provide a high temperature heat exchange and heat storage device having the high temperature heat exchange and heat storage mechanism, which is high in heat exchange efficiency.

For achieving the first and second object, the high temperature heat exchange and heat storage unit comprises a housing having a top and a bottom, containing a plurality of solid heat storage particles; wherein, the housing has a fluid inlet on the top of the housing for allowing a high temperature heat transfer fluid to flow in, and has a plurality of fluid outlets on the bottom of the housing for allowing the heat transfer fluid to flow out after heat exchange; a plurality of overflow ports, a plurality of overflow pipes for the heat transfer fluid to pass through, and a heat exchange pipe for the fluid to be heated to pass through is disposed inside the housing; each overflow pipe communicates with one corresponding overflow port and one corresponding fluid outlet of the housing, and a highest point of each overflow pipe is lower than the top of the housing.

There are many specific implementations for the overflow port and the overflow pipe. Preferably, each overflow pipe with a top opening and a bottom opening is vertically disposed inside the housing, the highest point of each overflow pipe is higher than that of the solid heat storage particles stacked in the housing; the top opening of each overflow pipe is defined as the overflow port and the bottom opening of each overflow pipe is in communication with one corresponding fluid outlet of the housing; and a plurality of filter boxes each having a top wall and a peripheral wall are disposed inside the housing and located on the bottom of the housing, each filter box has a plurality of filter holes for allowing the heat transfer fluid to permeate through at the peripheral wall of the filter box, and diameters of each filter hole is less than particle sizes of the solid heat storage particles, each filter box also has a circulating port for allowing the heat transfer fluid to flow in, each circulating port is in communication with the corresponding fluid inlet of the housing. Thus, the heat transfer fluid in the housing can permeate into the filter box through the filter holes, while the housing outside the filter box contains the solid heat storage particles. In addition, when the circulating port of the filter box is in communication with the fluid inlet of the housing, the heat transfer fluid flowing from the fluid inlet into the housing enters the filter box and then permeates into the housing from inside to outside through the filter holes, and the heat transfer fluid entering the housing fully exchanges heat with the solid heat storage particles and then flows out of the housing through the fluid outlets.

Preferably, a flow guide pipe with a top opening and a bottom opening is vertically disposed inside the housing, the circulating port is located on the top wall of the filter box, the top opening of the flow guide pipe is communication with the fluid inlet of the housing and the bottom opening of the flow guide pipe is communication with the circulating port of the filter box. Thus, the heat transfer fluid flowing through the fluid inlet flows into the filter box along the heat conducting pipe, then permeates into the housing from inside to outside through the filter holes on the filter box, and fully exchanges heat with the solid heat storage particles in the housing; and, the heat transfer fluid after heat exchange flows out of the housing from the fluid outlets.

As another specific embodiment of the overflow port and the overflow pipe, each overflow pipe has a top opening which is defined as the overflow port and a bottom opening which is in communication with the fluid outlet of the housing; and a plurality of filter boxes each having a top wall and a peripheral wall are disposed inside the housing and located on the bottom of the housing, each filter box has a plurality of filter holes for allowing the heat transfer fluid to permeate through at the peripheral wall of the filter box, and diameters of each filter hole is less than particle sizes of the solid heat storage particles, each filter box also has a circulating port for allowing the heat transfer fluid to flow in, each circulating port is in communication with the corresponding fluid inlet of the housing. Thus, the heat transfer fluid flowing into the housing from the fluid inlet directly fully exchanges heat with the solid heat storage particles in the housing, and the heat transfer fluid after heat exchange permeates into the filter box through the filter holes and finally flows out through the fluid outlets of the housing.

Preferably, the overflow pipe is an inverted U-shaped pipe, and each circulating port is located at the top wall of the corresponding filter box. On one hand, the flow rate of the heat transfer fluid after entering the overflow pipe can be reduced, so that the heat transfer fluid can fully exchange heat with the solid heat storage particles in the housing; on the other hand, the heat transfer fluid after fully heat exchange can smoothly flow out from the fluid outlets of the housing.

Preferably, the overflow pipe has a vent hole at the highest point of the overflow pipe, to prevent that the heat transfer fluid in the housing cannot continuously maintain the set liquid level due to the siphon phenomenon after stopping operation.

Preferably, the heat transfer fluid is one or both of a molten salt or a heat transfer oil. The molten salt and the heat transfer oil can fill all solid gaps, greatly reduce the thermal resistance and significantly increase the heat exchange area, thereby realizing efficient heat exchange and greatly reducing the end temperature difference of heat exchange.

Preferably, the solid heat storage particles are one or both of forsterite olivine or quartz. Thus, good heat exchange and heat storage effects can be achieved.

Preferably, the particle size of each solid heat storage particle is 2 mm to 20 mm. Thus, the solid heat storage particles can be prevented from entering the filter box, and meanwhile, the flow resistance of the molten salt between the solid heat storage particles can be reduced.

For achieving the third object, the high temperature heat exchange and heat storage mechanism comprises the above mentioned high temperature heat exchange and heat unit.

Preferably, at least two high temperature heat exchange and heat storage units are stacked atop each other, the fluid outlet of the housing of the upper high temperature heat exchange and heat storage unit is in communication with the fluid inlet of the lower high temperature heat exchange and heat storage unit, and the heat exchange pipe of the upper high temperature heat exchange and heat storage unit is in communication with the heat exchange pipe of the lower high temperature heat exchange and heat storage unit. Thus, the heat transfer fluid flowing out of the upper high temperature heat exchange and heat storage unit flows into the lower high temperature heat exchange and heat storage unit, and the liquid level in the housing of the lower high temperature heat exchange and heat storage unit rises accordingly. Similarly, after releasing heat, the heat transfer fluid flows into the next lower high temperature heat exchange and heat storage unit. In this way, the heat transfer fluid in the stacked high temperature heat exchange and heat storage units will flow automatically layer by layer, thereby realizing the heat release of the heat transfer fluid layer by layer. Thus, in each high temperature heat exchange and heat storage unit, the temperature of the upper portion is lower while the temperature of the lower portion is higher. For the whole high temperature heat exchange and heat storage mechanism, the temperature of the upper high temperature heat exchange and heat storage unit is higher than that of the lower high temperature heat exchange and heat storage unit. In this way, the temperature of the high temperature heat exchange and heat storage mechanism rises continuously, thus realizing heat storage.

For achieving the fourth object, the high temperature heat exchange and heat storage device comprises the above mentioned high temperature heat exchange and heat mechanism.

Preferably, the high temperature heat exchange and heat storage device further comprises a heating unit for heating the heat transfer fluid and a backflow circulating unit, wherein the heating unit comprises a heater with a heating inlet and a heating outlet, and the backflow circulating unit comprises a backflow circulating chamber with a backflow port and an output port; the backflow circulating unit is located below the high temperature heat exchange and heat storage mechanism; the fluid outlet of the housing of the high temperature heat exchange and heat storage unit located on the bottom of the high temperature heat exchange and heat storage mechanism is in communication with the backflow port of the backflow circulating chamber, the output port of the backflow circulating chamber is in communication with the heating inlet of the heater, and the heating outlet of the heater is in communication with the fluid inlet of the housing of the high temperature heat exchange and heat storage unit located on the top of the high temperature heat exchange and heat storage mechanism. Thus, after heat exchange, the heat transfer fluid is collected in the backflow circulating unit, and then the heat transfer fluid in the backflow circulating unit is input into the heating unit. The heat transfer fluid is heated by the heater in the heating unit, and the heated high temperature heat transfer fluid enters the housing of the high temperature heat exchange and heat storage unit located on the top of the high temperature heat exchange and heat storage mechanism again.

Preferably, the output port of the backflow circulating chamber communicates with the heating inlet of the heater through a delivery pipe, and a delivery pump is mounted on the delivery pipe, so that the circulation and flow rate of the heat transfer fluid can be further quickened, and the heat exchange efficiency of the high temperature heat exchange and heat storage device can be improved.

Compared with the prior art, the present invention has the following advantages. The high temperature heat transfer fluid flows into the housing through the fluid inlet and exchanges heat with the solid heat storage particles filled in the housing. The solid heat storage particles complete heat storage and are used to heat the fluid to be heated in the heat exchange pipe, and after heat exchange, the heat transfer fluid flows out from the fluid outlet of the housing, thereby achieving efficient heat exchange and heat storage between the high temperature heat transfer fluid and the solid heat storage particles. In addition, since the highest point of the overflow pipe is lower than the top end of the housing, no sealing structure needs to be disposed at the fluid inlet of the housing, so that the high temperature heat exchange and heat storage unit is simple in structure. Moreover, when the high temperature heat exchange and heat storage unit is assembled into a high temperature heat exchange and heat storage mechanism, rapid assembly can be achieved by stacking the high temperature heat exchange and heat storage units on top of another, and the assembly requirements of high temperature heat exchange and heat storage devices of various different specifications can be satisfied. The high temperature heat exchange and heat storage device can be disassembled into a plurality of high temperature heat exchange and heat storage units during transportation, and it is only necessary to stack the high temperature heat exchange and heat storage units atop of each other during mounting, so that it is very convenient to manufacture, transport and assemble.

DETAILED DESCRIPTION OF THE INVENTION

The present invention will be further described below in detail by embodiments with reference to the accompanying drawings.

It should be noted that in the description of the present invention, the terms "center", "longitudinally", "horizontally", "length", "width", "thickness", "up, down", "front, back", "left, right", "vertical", "parallel", "top, bottom", "inside, outside", "clockwise", "counterclockwise", "axial direction", "radial direction", "circumferential direction", etc. to describe a direction or position based on the accompanying drawings are only used for describe the present invention and simplify the description, instead of indicating that devices or elements must have particular orientation or must be constructed and operated in a particular orientation. Since the embodiments disclosed by the present invention can be set in different directions, these terms indicating directions are only used as explanations and should not be used as restrictions. For example, the verbs "up", "down" should not be limited to the direction opposite or consistent with the gravity. In addition, a feature defined as "first" or "second" may explicitly or implicitly comprises one or more such features.

Embodiment 1

Figure 1:
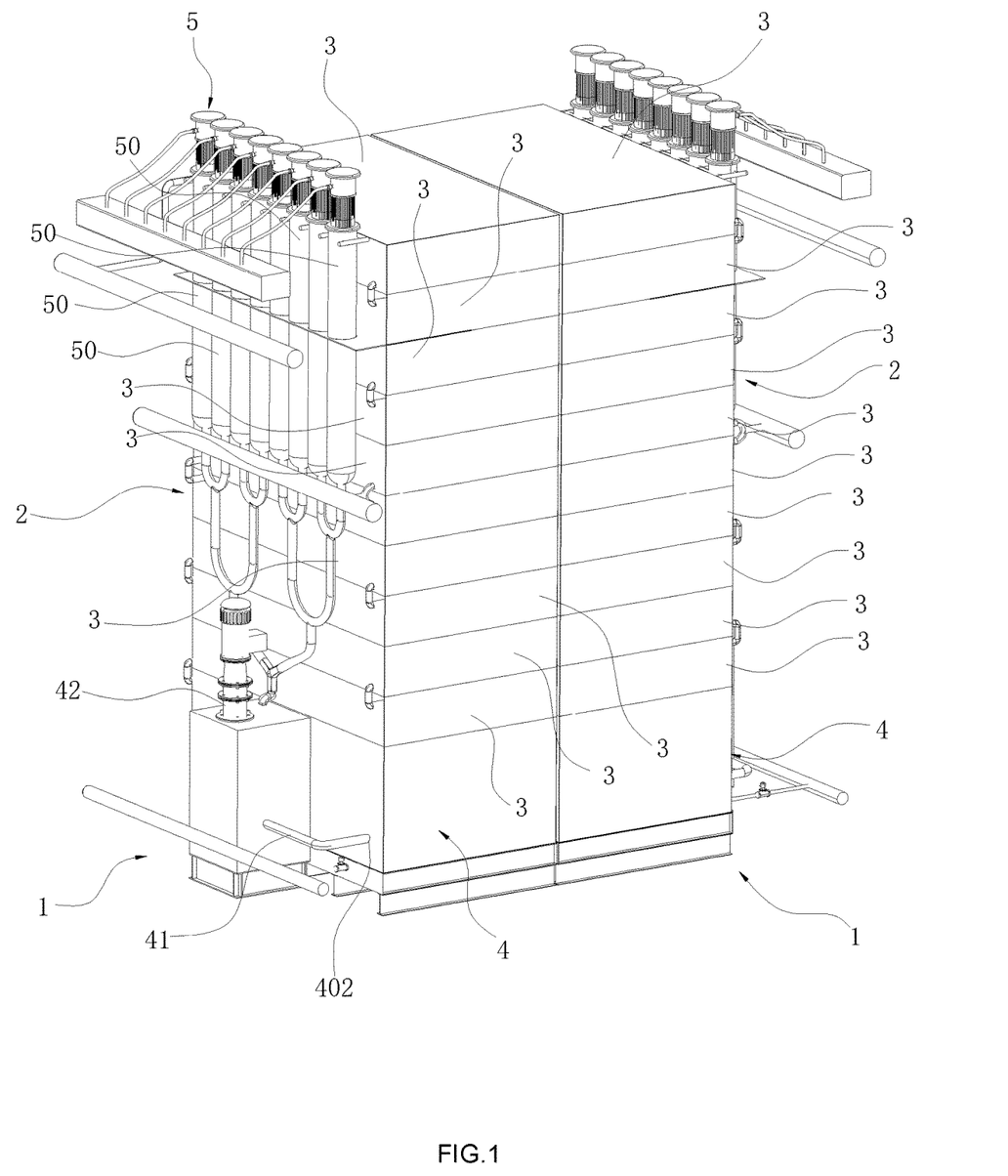
FIG. 1 is a perspective view of a high temperature heat exchange and heat storage device according to an embodiment of the present invention.

FIG. 1 shows a preferred embodiment of the high temperature heat exchange and heat storage device of the present invention. The high temperature heat exchange and heat storage device comprises a high temperature heat exchange and heat storage mechanism 2 according to a first embodiment (Embodiment 1). The high temperature heat exchange and heat storage mechanism 2 comprises at least two (generally more than ten) high temperature heat exchange and heat storage units 3 stacked atop of each other. FIG. 1 shows a combination of the two high temperature heat exchange and heat storage devices 1 back to back.

Figure 2:
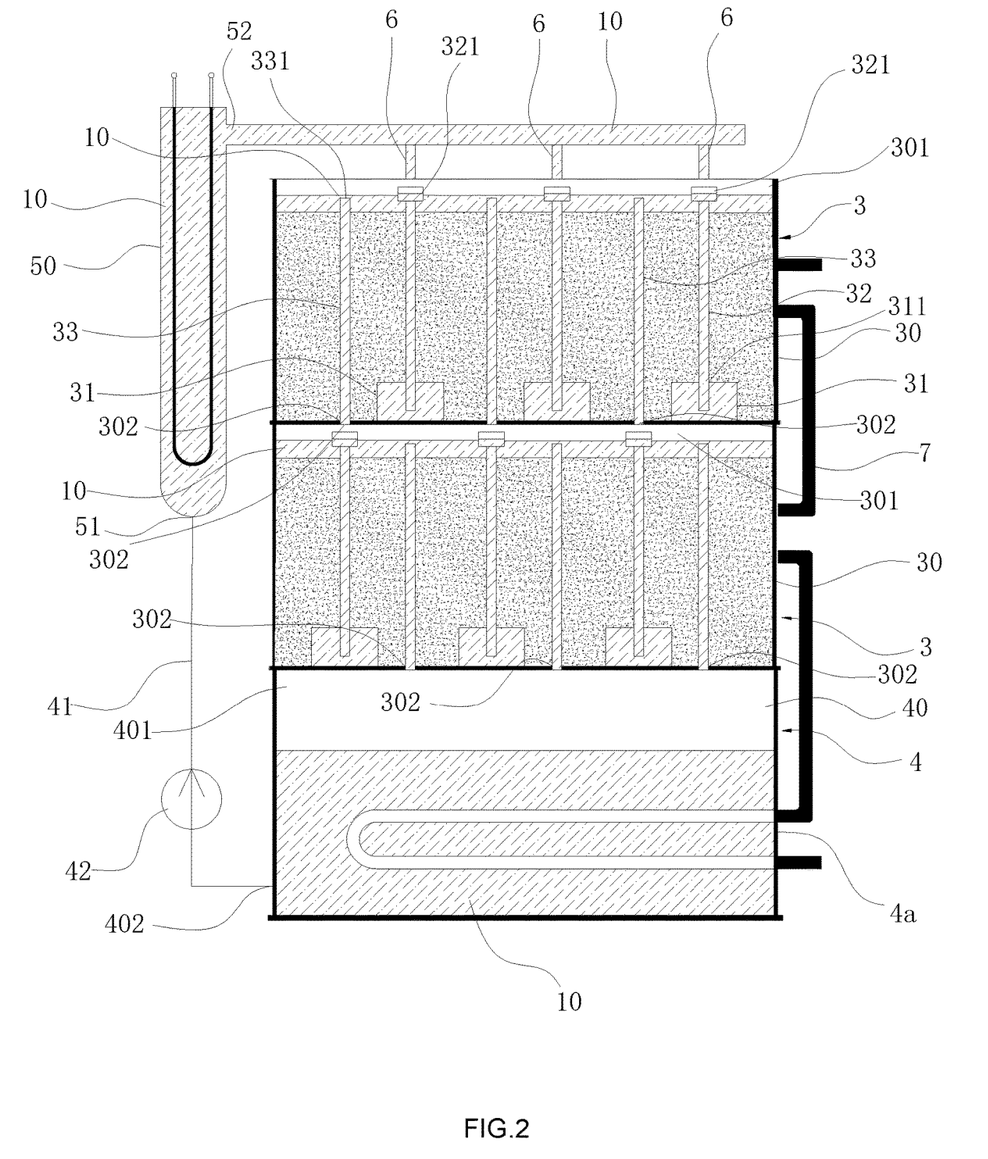
FIG. 2 is a sectional view of a high temperature heat exchange and heat storage mechanism according to Embodiment 1 of the present invention.
Figure 3:
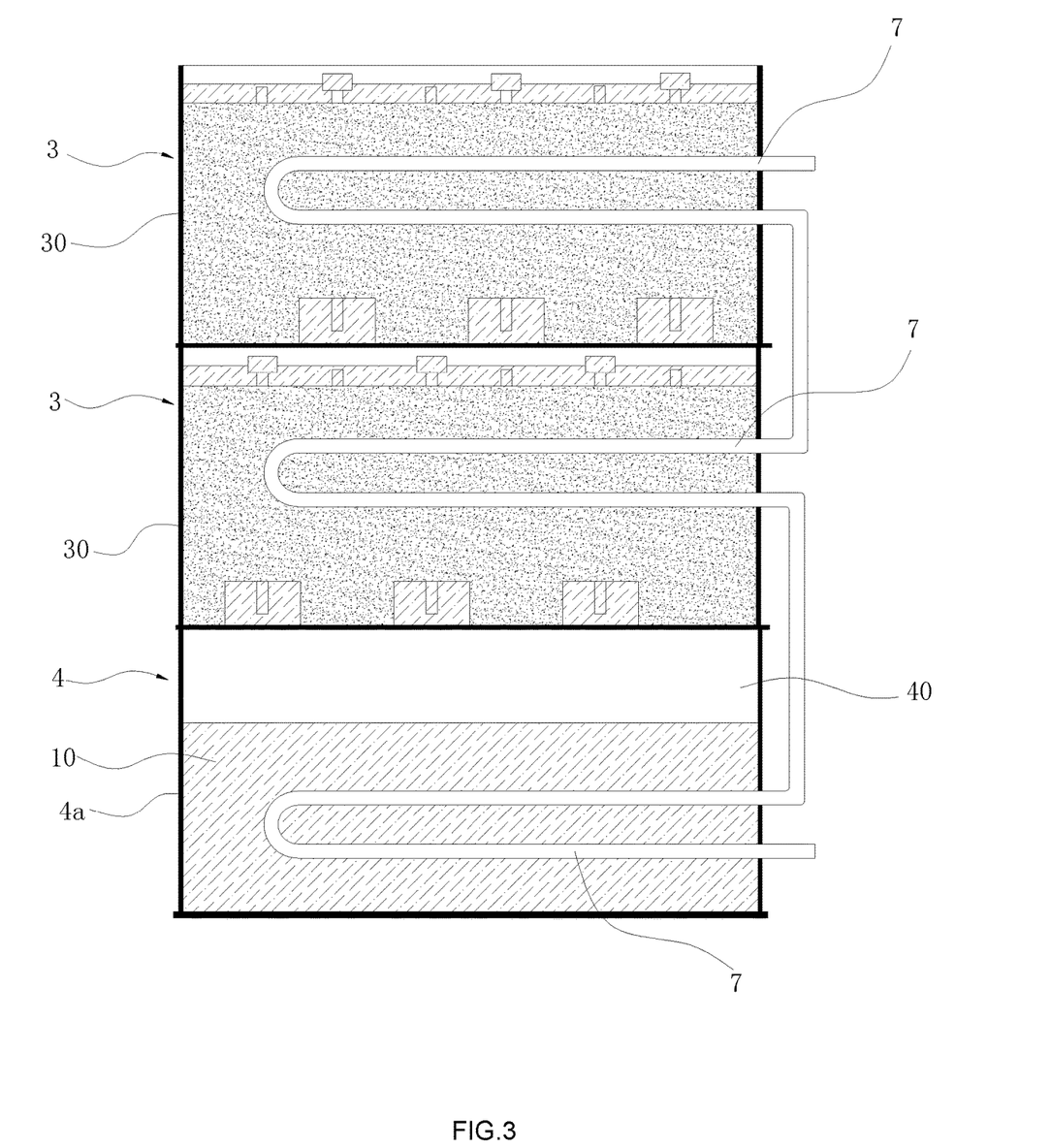
FIG. 3 is another sectional view of the high temperature heat exchange and heat storage mechanism according to Embodiment 1 of the present invention.

As shown in FIG. 2 and FIG. 3 (only two high temperature heat exchange and heat storage units 3 are illustrated), each high temperature heat exchange and heat storage unit 3 of this embodiment comprises a housing 30 having a top and a bottom, containing a plurality of solid heat storage particles. In addition, the housing 30 has a fluid inlet 301 on the top of the housing 30 for allowing a high temperature heat transfer fluid 10 to flow in, and has a plurality of fluid outlets 302 on the bottom of the housing 30 for allowing the heat transfer fluid 10 to flow out after heat exchange. In this embodiment, the housing 30 is opened upward on the top to form the fluid inlet 301.

Further, a plurality of overflow ports 331, a plurality of overflow pipes 33 for the heat transfer fluid 10 to pass through, and a heat exchange pipe 7 for the fluid to be heated water in this embodiment is disposed inside the housing 30; each overflow pipe 33 communicates with one corresponding overflow port 331 and one corresponding fluid outlet 302 of the housing 30, and a highest point of each overflow pipe 33 is lower than the top of the housing 30.

Thus, in the present invention, the high temperature heat transfer fluid 10 flows into the housing 30 through the fluid inlet 301 and exchanges heat with the solid heat storage particles filled in the housing 30. The solid heat storage particles complete heat storage and are used to heat the fluid to be heated in the heat exchange pipe 7, and the heat transfer fluid 10 after heat exchange flows out from the fluid outlet 302 of the housing 30, thereby achieving efficient heat exchange and heat storage between the high temperature heat transfer fluid 10 and the solid heat storage particles. In addition, since the overflow pipe 33 allows the heat transfer fluid 10 to circulate and the highest point of the overflow pipe 33 is lower than the top wall of the housing 30, no sealing structure needs to be disposed at the fluid inlet 301 of the housing 30, so that the high temperature heat exchange and heat storage unit 3 is simple in structure. Moreover, when the high temperature heat exchange and heat storage unit 3 is assembled into a high temperature heat exchange and heat storage mechanism 2, rapid assembly can be realized by stacking the high temperature heat exchange and heat storage units 3 atop of each other, and the assembly requirements of high temperature heat exchange and heat storage devices 1 of various different specifications can be satisfied. The high temperature heat exchange and heat storage device 1 can be disassembled into a plurality of high temperature heat exchange and heat storage units 3 during transportation, and it is only necessary to stack the high temperature heat exchange and heat storage units 3 atop of each other during mounting, so that it is very convenient to manufacture, transport and assemble.

In this embodiment, when a plurality of high temperature heat exchange and heat storage units 3 are stacked atop of each other to rapidly assemble a high temperature heat exchange and heat storage mechanism 2, support structures (e.g., support blocks, support frames, etc. are arranged between adjacent high temperature heat exchange and heat storage units 3. Preferably, the cross section of the upper housing 30 is smaller than or equal to that of the lower housing 30. Preferably, the housing 30 is in a cuboid shape. Further, the housing 30 has at least two fluid outlets 302 which are formed at intervals on the bottom wall of the housing 30. In addition, preferably, in an operating state, the liquid level in the housing 30 remains unchanged, that is, the set liquid level is always maintained, thereby maintaining the certain heat exchange efficiency of high temperature heat exchange and heat storage unit 3.

Further, a plurality of filter boxes 31 each having a top wall and a peripheral wall are disposed inside the housing 30 and located on the bottom of the housing 30, each filter box 31 has a plurality of filter holes for allowing the heat transfer fluid 10 to permeate through at the peripheral wall of the filter box 31, and diameters of each filter hole is less than particle sizes of the solid heat storage particles, each filter box 31 also has a circulating port 311 for allowing the heat transfer fluid 10 to flow in, each circulating port 311 is in communication with the corresponding fluid inlet 301 of the housing 30. In this embodiment, there is a plurality of filter boxes 31, each filter box 31 is square, and each circulating port 311 is centered at the top of each filter box 31. In addition, an aperture of each filter hole on each filter box 31 is about 1.5 mm, and the particle size of each solid heat storage particle is 2 mm to 20 mm. On one hand, the solid heat storage particles can be prevented from entering the filter boxes 31; on the other hand, the flow resistance of the molten salt between the solid heat storage particles can be reduced. Thus, when the circulating ports 311 of the filter boxes 31 are in communication with the fluid inlet 301 of the housing 30, the heat transfer fluid 10 flowing from the fluid inlet 301 into the housing 30 enters the filter boxes 31 and then permeates into the housing 30 from inside to outside through the filter holes, and the heat transfer fluid 10 entering the housing 30 fully exchanges heat with the solid heat storage particles and then flows out of the housing 30 through the fluid outlets 302.

In this embodiment, the heat transfer fluid 10 is one or both of a molten salt or a heat transfer oil. The molten salt and the heat transfer oil can fill the gaps between the solid heat storage particles, greatly reduce the thermal resistance and significantly increase the heat exchange area, thereby realizing efficient heat exchange and greatly reducing the temperature difference during heat exchange. In this embodiment, the heat transfer fluid 10 is preferably a liquid molten salt. The solid heat storage particles are one or both of forsterite olivine or quartz, so that good heat exchange and heat storage effects can be achieved.

Further, at least two flow guide pipes 32 with a top opening and a bottom opening are vertically disposed inside the housing 30, each flow guide pipe 32 is in correspondence to each filter box 31 and located on the respective filter box 3. The top opening of the flow guide pipe 32 is communication with the fluid inlet 301 of the housing 30 and the bottom opening of the flow guide pipe 32 is communication with the circulating port 311 of the filter box 31. Thus, the heat transfer fluid 10 flowing through the fluid inlet 301 flows into the corresponding filter box 31 along the flow guide pipe 32, then permeates into the housing 30 from inside to outside through the filter holes on the filter box 31, and fully exchanges heat with the solid heat storage particles in the housing 30; and, the heat transfer fluid 10 after heat exchange flows out of the housing 30 from the fluid outlet 302. Preferably, to ensure that the heat transfer fluid 10 can better flow into the corresponding flow guide pipe 32, each flow guide box 321 is sleeved on the top opening of each flow guide pipe 32, and each flow guide pipe 321 is in correspondence to each fluid outlet 302 or each distribution pipe 6 described below (the high temperature heat exchange and heat storage unit 3 on the top), each flow guide pipe 321 faces each fluid outlet 302 or each distribution pipe 6.

At least two overflow pipes 33 with a top opening and a bottom opening are vertically disposed inside the housing 30. Each overflow pipe 33 is in correspondence to each filter box 31. Each overflow pipe 33 has a top opening which is defined as the overflow port 331 and each overflow port 311 is higher than the packed height of the solid heat storage particles in the housing 30, and the bottom opening of the overflow pipe 33 is communicated with the fluid outlet 302. Thus, when the liquid level of the heat transfer fluid 10 in the housing 30 is higher than the overflow port 331 of each overflow pipe 33, the heat transfer fluid 10 can flow out of the housing 30 through the fluid outlet 302 along the overflow pipe 33. By uniformly arrangement of the fluid inlet 301, the filter boxes 31, the flow guide pipes 32 and the overflow pipes 33, it is ensured that the heat transfer fluid 10 can be uniformly distributed and circulated in the housing 30 according to regions, and the failure of the heat exchange can be avoided. In this embodiment, the filter boxes 31, the flow guide pipes 32 and the overflow pipes 33 are all made of metal heat conducting materials, and are all integrally connected to the housing 30 by welding.

Further, in the high temperature heat exchange and heat storage mechanism 2, the fluid outlet 302 of the housing 30 of the upper high temperature heat exchange and heat storage unit 3 is in communication with the fluid inlet 301 of the lower high temperature heat exchange and heat storage unit 3, and the heat exchange pipe 7 of the upper high temperature heat exchange and heat storage unit 3 is in communication with the heat exchange pipe 7 of the lower high temperature heat exchange and heat storage unit 3. Thus, the heat transfer fluid flowing out of the upper high temperature heat exchange and heat storage unit 3 flows into the lower high temperature heat exchange and heat storage unit 3, and the liquid level in the housing 30 of the lower high temperature heat exchange and heat storage unit 3 rises accordingly. Similarly, after releasing heat, the heat transfer fluid 10 flows into the next lower high temperature heat exchange and heat storage unit 3. In this way, the heat transfer fluid in the stacked high temperature heat exchange and heat storage units 3 will flow automatically layer by layer, thereby realizing the heat release of the heat transfer fluid layer by layer. Thus, in each high temperature heat exchange and heat storage unit 3, the temperature of the upper portion is lower while the temperature of the lower portion is higher. For the whole high temperature heat exchange and heat storage mechanism 2, the temperature of the upper high temperature heat exchange and heat storage unit 3 is higher than that of the lower high temperature heat exchange and heat storage unit 3. In this way, the temperature of the high temperature heat exchange and heat storage mechanism 2 rises continuously, thus realizing heat storage. In this embodiment, specifically, the bottom wall of the housing 30 of any one of the high temperature heat exchange and heat storage unit 3 covers the fluid inlet 301 of the housing 30 below this high temperature heat exchange and heat storage unit 3.

In addition, the high temperature heat exchange and heat storage device 1 further comprises the heating unit 5, the backflow circulating unit 4 and the delivery pump 42. The heating unit 5 is used for heating the heat transfer fluid 10, the heating unit 5 can use high temperature steam as a heating source, and the heating unit 5 comprises the heater 50 with the heating inlet 51 and the heating outlet 52, wherein the heating inlet 52 is communicated with the fluid inlet 301 of the housing 30 of the high temperature heat exchange and heat storage unit 3 on the top of the high temperature heat exchange and heat storage mechanism 2 through the distribution pipe 6. The backflow circulating unit 4 is located below the high temperature heat exchange and heat storage mechanism 2, and the backflow circulating unit 4 comprises a backflow circulating chamber 40. The upper portion of the backflow circulating chamber 40 has a backflow port 401 in fluid communication with each fluid outlet 302 of the housing 30 of the high temperature heat exchange and heat storage unit 3 on the bottom of the high temperature heat exchange and heat storage mechanism 2, so that the heat transfer fluid 10 flowing into the high temperature heat exchange and heat storage mechanism 2 can flow back to the backflow circulating unit 4. Specifically, in this embodiment, the backflow circulating unit 4 comprises a backflow circulating box 4a opened upward, and the bottom wall of the housing 30 of the high temperature heat exchange and heat storage unit 3 on the bottom of the high temperature heat exchange and heat storage mechanism 2 covers the opening of the backflow circulating box 41 to form the backflow circulating chamber 40. The backflow circulating box 4a has an opening on the top, and the opening is defined as the backflow port 401.

In addition, a sidewall of the backflow circulating unit 4 has an output port 402, and the output port 402 communicates with the heating inlet 51 of the heater 5 through a delivery pipe 41. Thus, the heat transfer fluid 10 after heat exchange is collected in the backflow circulating unit 4, and then the heat transfer fluid 10 in the backflow circulating unit 4 is input into the heater 5. The heat transfer fluid 10 is heated in the heater 5, and the heated high temperature heat transfer fluid 10 enters the housing 30 of the high temperature heat exchange and heat storage unit 3 again. Preferably, the delivery pump 42 is mounted on the delivery pipe 41. In addition, in this embodiment, steam heat exchange pipes 7 communicated with each other are inserted into each high temperature heat exchange and heat storage unit 3 and each backflow circulating unit 4 of the high temperature heat exchange and heat storage device 1, and the water in the steam heat exchange pipes 7 exchanges heat with the medium in each unit to realize heat release.

The operation principle in this embodiment is described below.

In the heat storage process, the heat transfer fluid 10 with a relatively low temperature is input into the delivery pump 42 from the backflow circulating unit 4 by the delivery pump 41, and then driven into the heating unit 5 by the delivery pump 42. The heat transfer fluid 10 is heated in the heater 50 of the heating unit 5 and then passes through the fluid inlet 301 to enter the high temperature heat exchange and heat storage unit 3 on the top through the distribution pipe 6. When the liquid level of the heat transfer fluid 10 in the high temperature heat exchange and heat storage unit 3 is higher than the overflow port 331 of each overflow pipe 33, the heat transfer fluid 10 after fully heat exchange overflows into the lower high temperature heat exchange and heat storage unit 3 through each fluid outlet 302. In this continuous process, the heat transfer fluid 10 in the high temperature heat exchange and heat storage unit 3 flows from up to down, and releases heat when flowing through the solid heat storage particles. The temperature of the solid particles gradually rises, so that heat storage is realized. Meanwhile, the liquid level of the heat transfer fluid 10 in the lower high temperature heat exchange and heat storage unit 3 also increases, and flows to a lower high temperature heat exchange and heat storage unit 3 after releasing heat in the similar way as above.

In the above way, the heat transfer fluid 10 in the stacked high temperature heat exchange and heat storage units 3 will overflow layer by layer and finally reach the bottom backflow circulating unit 4, thereby realizing the heat release of the heat transfer fluid 10 layer by layer and realizing the heat storage of the solid heat storage particles.

In the heat release process, water enters the bottom backflow circulating unit 4 from the lower steam-water heat exchange pipe 7 and then flows upward to the high temperature heat exchange and heat storage units 3 located above the backflow circulating unit 4, and is heated, evaporated and overheated in the upward flowing process to become high temperature steam. The heat transfer fluid 10 is circulated repeatedly as described in the above heat storage process, and transfers heat energy to the steam medium when flowing through the surface of the steam heat exchange pipe 7. In this process, the heat transfer fluid 10 continuously takes out the heat energy of the solid heat storage particles, thus realizing heat release.

In the above process, the heat transfer fluid 10 mainly serves as a heat transfer medium to realize the heat transfer in each link of the heat storage and release process. Moreover, since the heat transfer fluid 10 has the heat storage capacity as its temperature rises, the heat transfer fluid 10 itself is also a heat storage medium.

Embodiment 2

Figure 4:
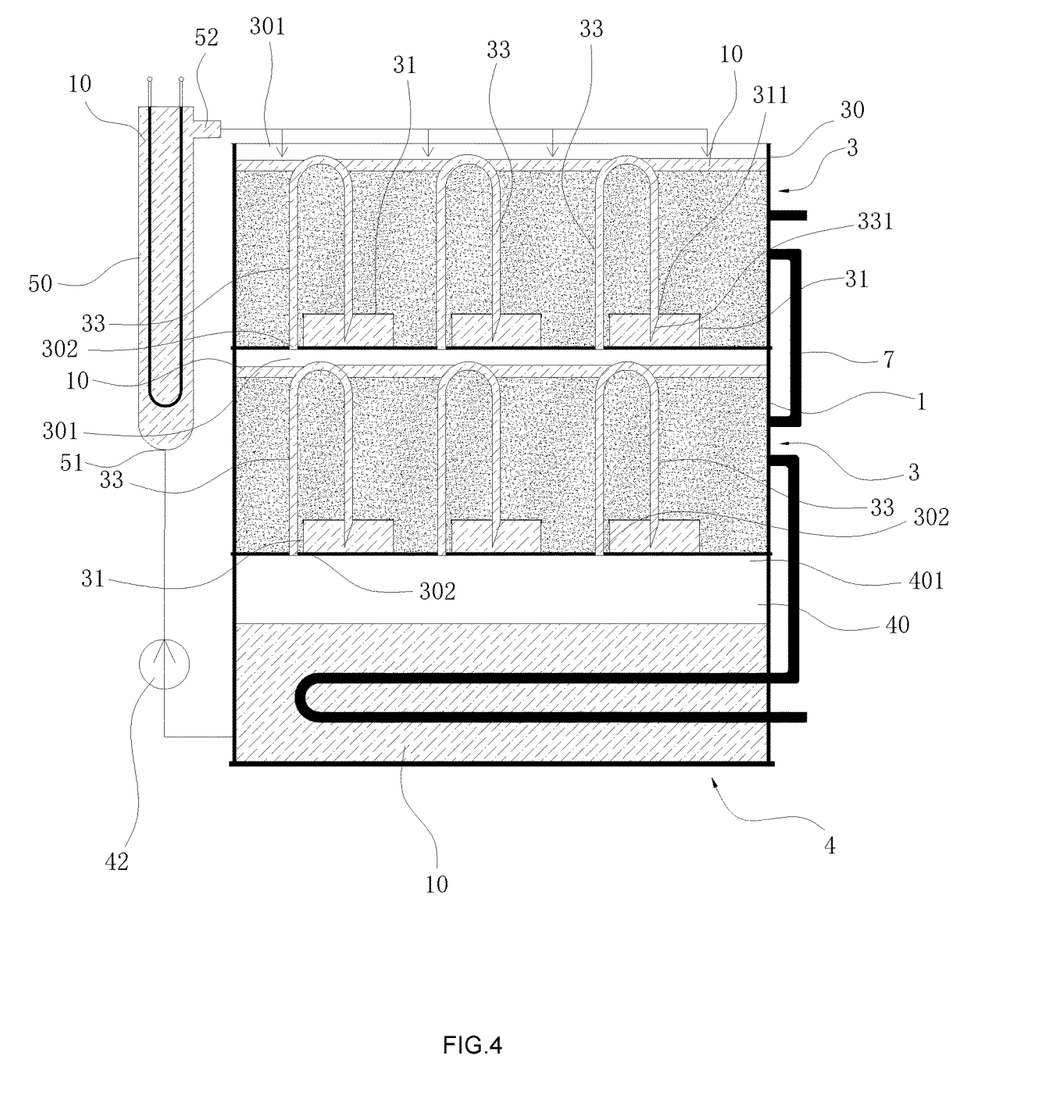
FIG. 4 is a sectional view of the high temperature heat exchange and heat storage mechanism according to Embodiment 2 of the present invention.
Figure 5:
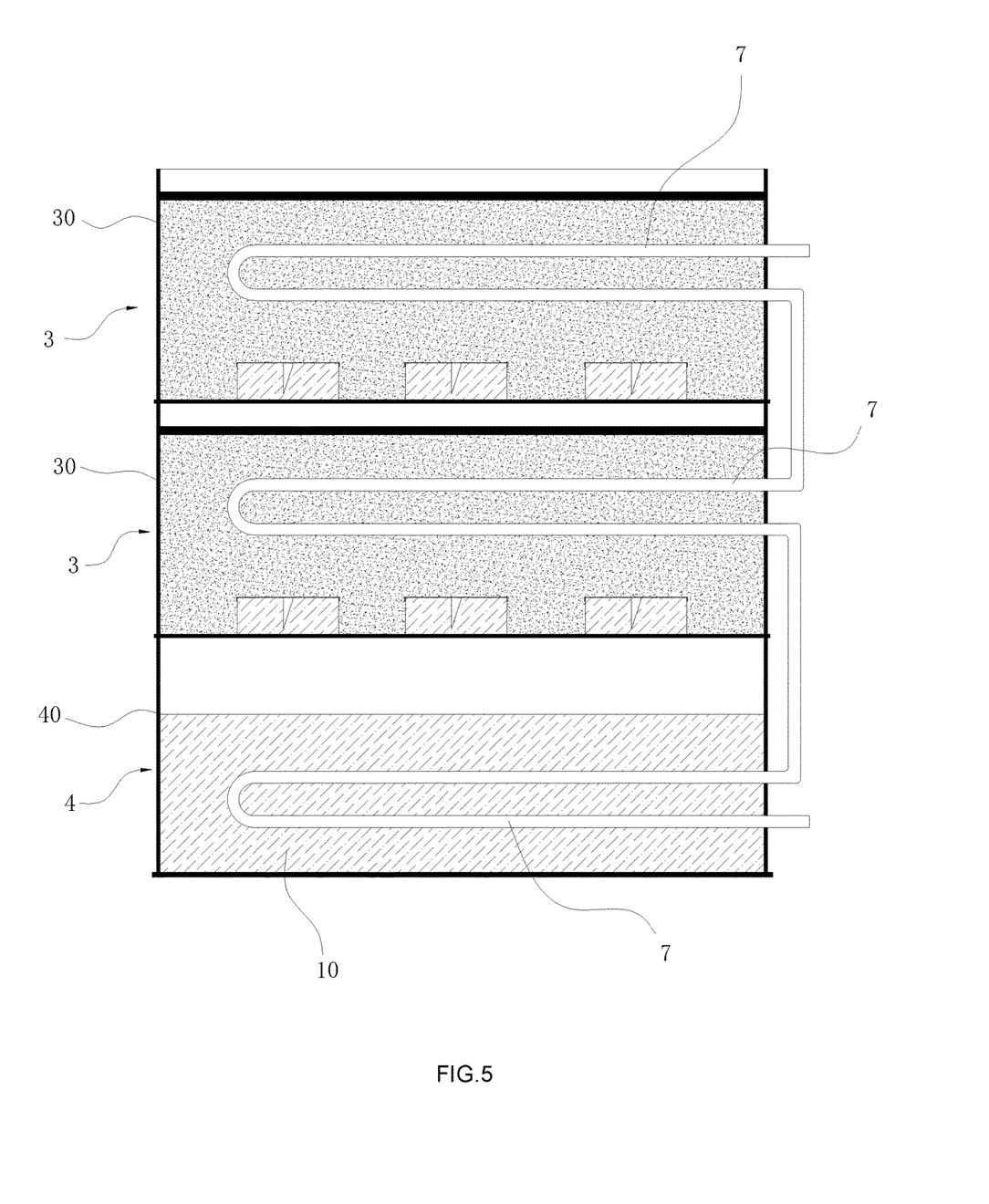
FIG. 5 is another sectional view of the high temperature heat exchange and heat storage mechanism according to Embodiment 2 of the present invention.

FIGS. 4 and 5 show a second embodiment (Embodiment 2) of the high temperature heat exchange and heat storage mechanism 2, the mechanism 2 of this embodiment has the following difference compared with that of the first embodiment, each overflow pipe 33 has a top opening which is defined as the overflow port 331 and a bottom opening which is in communication with the fluid outlet 302 of the housing 30; and a plurality of filter boxes 31 each having a top wall and a peripheral wall are disposed inside the housing 30 and located on the bottom of the housing 30, each filter box 31 has a plurality of filter holes for allowing the heat transfer fluid 10 to permeate through at the peripheral wall of the filter box 31, and diameters of each filter hole is less than particle sizes of the solid heat storage particles, each filter box 31 also has a circulating port 311 for allowing the heat transfer fluid 10 to flow in, each circulating port 311 is in communication with the corresponding fluid inlet 301 of the housing 30. Thus, the heat transfer fluid 10 flowing into the housing 30 from the fluid inlet 301 directly fully exchanges heat with the solid heat storage particles in the housing 10 and the heat transfer fluid 10 permeates into the filter box 31 through the filter holes and finally flows out through the fluid outlets 302 of the housing 10.

Specifically, in this embodiment, the overflow pipe 33 is an inverted U-shaped pipe, and each circulating port 311 is located at the top wall of the corresponding filter box 31. On one hand, the flow rate of the heat transfer fluid 10 after entering the overflow pipe 33 can be reduced, so that the heat transfer fluid 10 can fully exchange heat with the solid heat storage particles in the housing 30; on the other hand, the heat transfer fluid 10 after fully heat exchange can smoothly flow out from the fluid outlets 302 of the housing 30. Preferably, each overflow pipe 33 has a vent hole (not shown in figures) at the top end so as to prevent that the heat transfer fluid 10 in the housing 30 cannot continuously maintain the set liquid level due to the siphon phenomenon after stopping operation.

The operation principle in this embodiment is described below.

In the heat storage process, the heat transfer fluid 10 with a relatively low temperature is input into the delivery pump 42 from the backflow circulating unit 4 by the delivery pump 41, and then driven into the heating unit 5 by the delivery pump 42. The heat transfer fluid 10 is heated in the heater 50 of the heating unit 5 and then passes through the respective fluid inlet 301 to enter the high temperature heat exchange and heat storage unit 3 on the top through the distribution pipe 6. The liquid level of the heat transfer fluid 10 in the high temperature heat exchange and heat storage unit 3 increases, and the liquid level in the overflow pipe 33 also increases. When the liquid level is higher than the top end of the overflow pipe 33, the heat transfer fluid 10 flows through the other end of the overflow pipe 33 to the next high temperature heat exchange and heat storage unit 3. The heat transfer fluid 10 releases heat when flowing through the solid heat storage particles, and the temperature of the solid heat storage particle gradually rises, thereby realizing heat storage. Meanwhile, the liquid level of the heat transfer fluid 10 in lower high temperature heat exchange and heat storage unit 3 also increases, and flows to a lower high temperature heat exchange and heat storage unit 3 after releasing heat in the similar way as above.

In the heat release process, water enters the bottom backflow circulating unit 4 from the lower steam-water heat exchange pipe 7 and then flows upward to the high temperature heat exchange and heat storage units 3 located above the backflow circulating unit 4, and is heated, evaporated and overheated in the upward flowing process to become high temperature steam. The heat transfer fluid 10 is circulated repeatedly as in the above heat storage process, and transfers heat energy to the steam medium when flowing through the surface of the steam heat exchange pipe. In this process, the heat transfer fluid 10 continuously takes out the heat energy of the solid heat storage particles, thus realizing heat release.

The present invention is applied to solar photo-thermal power generation systems. Compared with the prior art, the heat storage capacity is significantly improved, and the system device is greatly simplified. As calculated according the same installed capacity, the investment cost is only less than ½ of that of the existing technology, and the operation cost is less than ¼ of that of the existing technology.

The present invention is applied in the field of conventional thermal power generation, can store steam energy produced by power station boilers at a low electrical load, and can greatly enhance the peak load regulation capacity of the unit, thereby realizing the comprehensive economy of the power plant and improving the safety and reliability of power grid operation.

Compared with the pumped storage technology, in the present invention, the investment cost is reduced from nearly 850 yuan/kw·h to less than 480 yuan/kw·h, and the energy efficiency can reach above 70%. Therefore, the present invention has obvious economic and social benefits, and has a promising application prospect due to its outstanding characteristics of energy saving and emission reduction in the energy source field.

The term "communication" in the present invention refers to a spatial positional relationship between two components or parts (hereinafter collectively referred as the first part and the second part), that is, the fluid (gas, liquid or a mixture thereof) can flow and/or be transported from the first part to the second part along the flowing path. The first part and the second part may be directly communicated with each other, or may be indirectly communicated with each other through at least one third parts. The third part may be pipes, passages, ducts, flow guide members, holes or grooves, or may be chambers for allowing the fluid to flow through, or combination of both.

The invention claimed is:

1. A high temperature heat exchange and heat storage unit, comprising:
 a housing (30) having a top and a bottom, containing a plurality of solid heat storage particles;
 wherein,
 the housing (30) has a fluid inlet (301) on the top of the housing (30) for allowing a high temperature heat transfer fluid (10) to flow in, and has a plurality of fluid outlets (302) on the bottom of the housing (30) for allowing the heat transfer fluid (10) to flow out after heat exchange;
 a plurality of overflow ports (331), a plurality of overflow pipes (33) for the heat transfer fluid to pass through, and a heat exchange pipe (7) for the fluid to be heated to pass through are disposed inside the housing (30);
 each overflow pipe (33) communicates with one corresponding overflow port (331) and one corresponding fluid outlet (302) of the housing (30), and a highest point of each overflow pipe (33) is lower than the top of the housing (30).

2. The high temperature heat exchange and heat storage unit of claim 1, wherein each overflow pipe (33) with a top opening and a bottom opening is vertically disposed inside the housing (30), the highest point of each overflow pipe (33) is higher than that of the solid heat storage particles stacked in the housing (30); the top opening of each overflow pipe (33) is defined as the overflow port (331) and the bottom opening of each overflow pipe (33) is in communication with one corresponding fluid outlet (302) of the housing (30);

and a plurality of filter boxes (31) each having a top wall and a peripheral wall are disposed inside the housing (30) and located on the bottom of the housing (30), each filter box (31) has a plurality of filter holes for allowing the heat transfer fluid (10) to permeate through at the peripheral wall of the filter box (31), and diameters of each filter hole is less than particle sizes of the solid heat storage particles, each filter box (31) also has a circulating port (311) for allowing the heat transfer fluid (10) to flow in, each circulating port (311) is in communication with the corresponding fluid inlet (301) of the housing (30).

3. The high temperature heat exchange and heat storage unit of claim 2, wherein a flow guide pipe (32) with a top opening and a bottom opening is vertically disposed inside the housing (30), the circulating port (311) is located on the top wall of the filter box (31), the top opening of the flow guide pipe (32) is communication with the fluid inlet (301) of the housing (30) and the bottom opening of the flow guide pipe (32) is communication with the circulating port (311) of the filter box (31).

4. The high temperature heat exchange and heat storage unit of claim 1, wherein each overflow pipe (33) has a top opening which is defined as the overflow port (331) and a bottom opening which is in communication with the fluid outlet (302) of the housing (30);

and a plurality of filter boxes (31) each having a top wall and a peripheral wall are disposed inside the housing (30) and located on the bottom of the housing (30), each filter box (31) has a plurality of filter holes for allowing the heat transfer fluid (10) to permeate through at the peripheral wall of the filter box (31), and diameters of each filter hole is less than particle sizes of the solid heat storage particles, each filter box (31) also has a circulating port (311) for allowing the heat transfer fluid (10) to flow in, each circulating port (311) is in communication with the corresponding fluid inlet (301) of the housing (30).

5. The high temperature heat exchange and heat storage unit of claim 4, wherein the overflow pipe (33) is an inverted U-shaped pipe, and each circulating port (311) is located at the top wall of the corresponding filter box (31).

6. The high temperature heat exchange and heat storage unit of claim 5, wherein the overflow pipe (33) has a vent hole at the highest point of the overflow pipe (33).

7. The high temperature heat exchange and heat storage unit of claim 1, wherein the heat transfer fluid (10) is one or both of a molten salt or a heat transfer oil.

8. The high temperature heat exchange and heat storage unit of claim 1, wherein the solid heat storage particles are one or both of forsteritic olivine or quartz.

9. The high temperature heat exchange and heat storage unit of claim 8, wherein the particle size of each solid heat storage particle is 2 mm to 20 mm.

10. A high temperature heat exchange and heat storage mechanism comprising the high temperature heat exchange and heat storage unit of claim 1.

11. The high temperature heat exchange and heat storage mechanism of claim 10, wherein at least two high temperature heat exchange and heat storage units (3) are stacked atop each other, the fluid outlet (302) of the housing (30) of the upper high temperature heat exchange and heat storage unit (3) is in communication with the fluid inlet (301) of the lower high temperature heat exchange and heat storage unit (3), and the heat exchange pipe (7) of the upper high temperature heat exchange and heat storage unit (3) is in communication with the heat exchange pipe (7) of the lower high temperature heat exchange and heat storage unit (3).

12. A high temperature heat exchange and heat storage device comprising the high temperature heat exchange and heat storage mechanism (2) of claim 11.

13. The high temperature heat exchange and heat storage device of claim 12, comprising:
a heating unit (5) for heating the heat transfer fluid (10);
a backflow circulating unit (4);
wherein,
the heating unit (5) comprises a heater (50) with a heating inlet (51) and a heating outlet (52), the backflow circulating unit (4) comprises a backflow circulating chamber (40) with a backflow port (401) and an output port (402);
the backflow circulating unit (4) is located below the high temperature heat exchange and heat storage mechanism (2), and the fluid outlet (302) of the housing (30) of the high temperature heat exchange and heat storage unit (3) located on the bottom of the high temperature heat exchange and heat storage mechanism (2) is in communication with the backflow port (401) of the backflow circulating chamber (40), and the output port (402) of the backflow circulating chamber (40) is in communication with the heating inlet (51) of the heater (50), and the heating outlet (52) of the heater (50) is in communication with the fluid inlet (301) of the housing (30) of the high temperature heat exchange and heat storage unit (3) located on the top of the high temperature heat exchange and heat storage mechanism (2).

14. The high temperature heat exchange and heat storage device of claim 13, wherein the output port (402) of the backflow circulating chamber (40) communicates with the heating inlet (51) of the heater (50) through a delivery pipe (41), and a delivery pump (42) is mounted on the delivery pipe (41).

* * * * *